J. D. SHORT.
SPRING WHEEL.
APPLICATION FILED JULY 27, 1910.
1,090,797.
Patented Mar. 17, 1914.
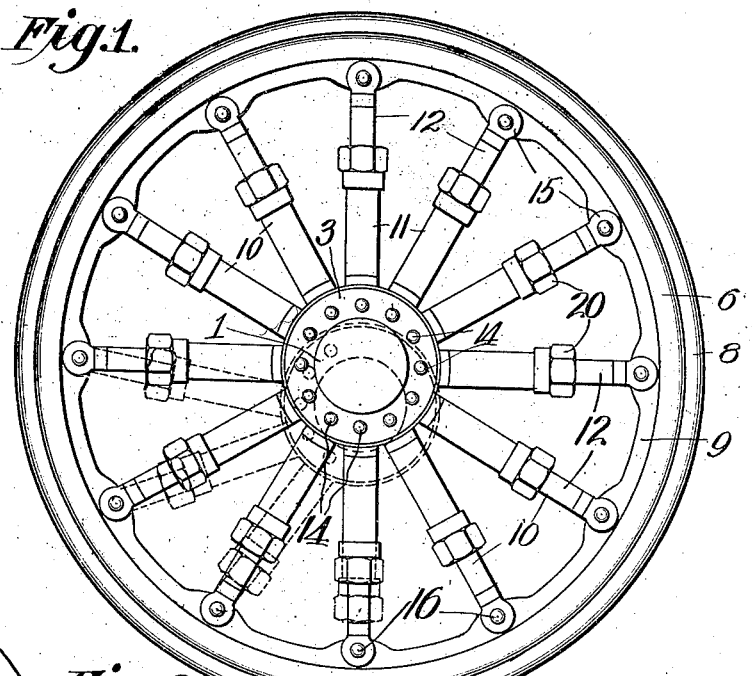
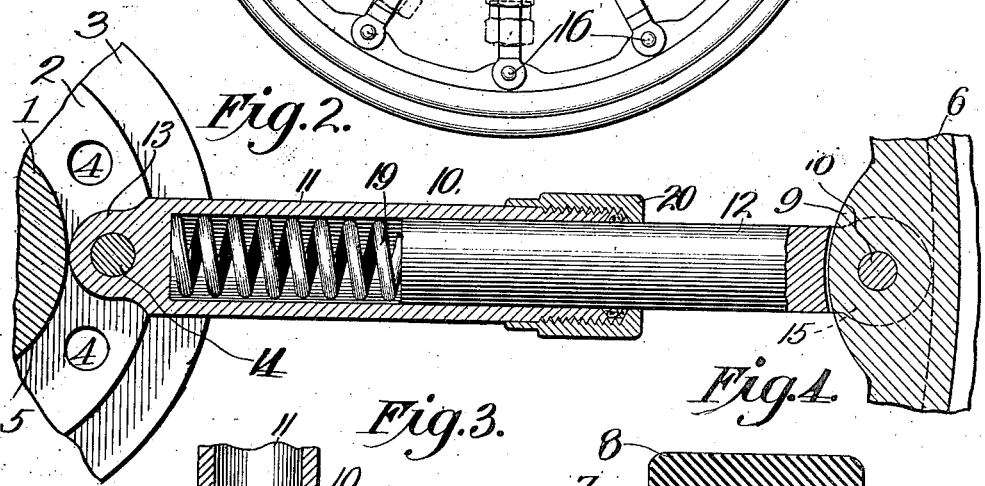
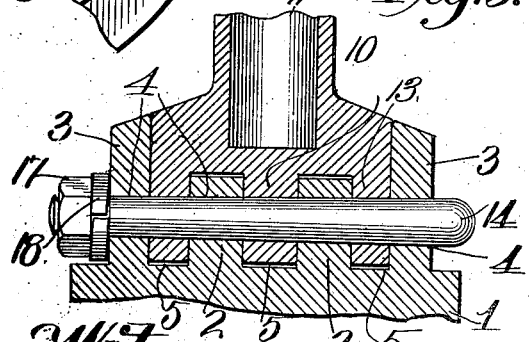
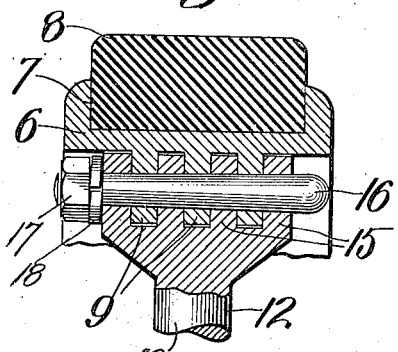
Witnesses
Frank R. Glon
H. C. Rodgers
Inventor
J. D. Short
By George Y. Thorpe Atty.

UNITED STATES PATENT OFFICE.

JEFFERSON D. SHORT, OF TEXHOMA, TEXAS.

SPRING-WHEEL.

1,090,797.  Specification of Letters Patent.  Patented Mar. 17, 1914.

Application filed July 27, 1910. Serial No. 574,154.

*To all whom it may concern:*

Be it known that I, JEFFERSON D. SHORT, a citizen of the United States, residing at Texhoma, in the county of Sherman and State of Texas, have invented certain new and useful Improvements in Spring-Wheels, of which the following is a specification.

This invention relates to spring wheels and more especially to spring wheels for use on motor vehicles, such as automobiles and motor cycles, and my object is to produce a wheel which will absorb the shock or jar incident to its passage over rough or uneven roadways and which is equipped with a solid instead of a pneumatic tire and is therefore non-puncturable.

A further object is to produce a wheel of this character of simple, strong, durable and compact construction and of neat and attractive appearance.

With these objects in view the invention consists in certain novel and peculiar features of construction and organization as hereinafter described and claimed; and in order that it may be fully understood reference is to be had to the accompanying drawing, in which—

Figure 1, is a side view of a spring wheel embodying my invention. Fig. 2, is an enlarged section to illustrate more clearly the construction of the telescopic spokes. Fig. 3, is a section showing the pivotal connection between the hub and the inner end of spoke. Fig. 4, is a similar view showing the pivotal connection between the rim and the outer end of spoke.

In the said drawing, 1 indicates the hub provided with suitably-spaced parallel ribs 2 and 3, provided with alined holes 4, the ribs 3 by preference projecting outward a greater distance than ribs 2, the spaces between the ribs constituting grooves 5.

6 is the rim of the wheel provided externally with a channel or groove 7 containing a solid rubber or other suitable tire 8, and projecting inward from the rim are suitably spaced ribs 9.

10 indicates the spokes, the same consisting of inner tubular members 11, and outer members 12, fitting telescopically within members 11, the inner members being widened at their inner ends to fit snugly between the ribs 3, and provided with perforated lugs 13 suitably spaced so as to fit in grooves 5, pivot pins 14 being employed to secure said inner members reliably to the hub. The outer members 12 are widened at their outer ends and are provided with perforated lugs 15 to engage the ribs 9 and be pivotally secured thereto at equi-distant points by pivot pins 16, corresponding in all respects to pivot pins 14, and in this connection it will be noticed that the pivot pins 14 and 16 taper so that they may be drawn farther through the engaged parts as the pivot holes in the latter become enlarged by wear, and thus guard against a rattling noise being produced at the pivotal points when the wheel is in motion. The said pins are threaded at their smaller ends and are engaged by nuts 17 and nut locks 18, the latter being preferably of the split spring type and mounted upon the pins and interposed between the nuts and the adjacent part of the hub in Fig. 3 and the spoke in Fig. 4.

It will be understood of course that I do not restrict myself to the use of the nut lock as other reliable securing means for the pivot pins may be employed.

19 indicates springs confined in the inner or tubular members 11 of the spokes and pressing inwardly upon said members and outwardly on members 12, the springs 19 tending to hold the hub concentrically within the rim and in order to exclude dust and water from the interior of members 11 of the spokes, stuffing boxes 20 are secured on the outer ends of said members and fit slidingly on the members 12, as shown most clearly in Fig. 2.

Assuming that weight is imposed through the axle upon the hub of the wheel, it will be apparent that the springs of the underlying spokes will yield and thus permit the hub of the wheel to occupy a position vertically below the axis of the rim, as indicated by dotted lines in Fig. 1, it being also noted that when the hub is thus depressed all of the spokes lying at opposite sides of the vertical center of the wheel operate pivotally and that all of the spokes are elongated, or contracted through the telescopic action of their members occasioned by the change of position of the hub, the springs above the horizontal center of the wheel tending to exert a relatively small pressure downward upon the hub and the springs below the hub exerting an increasing resistance to depression of the latter. If the wheel strikes and rides over an obstruction the telescopic spokes permit the hub to move downward and the springs below the center of the hub will cushion such movement and absorb the shock or jar incidental thereto.

From the above description it will be apparent that I have produced a spring wheel possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent, is:—

A spring wheel, comprising a hub provided with a pair of parallel circumferential ribs 3 and circumferential ribs 2, a rim provided externally with a plurality of circular ribs 9, telescopic spokes consisting of cylindrical inner members closed at their inner ends, and outer members fitting telescopically within the inner members, stuffing boxes secured on the outer ends of the inner members and around the outer members, springs within the inner members and bearing at their opposite ends against the closed ends of said members and the said outer members; the inner members fitting at their inner ends between the circumferential ribs of the hub and provided with perforated lugs occupying the spaces between said circumferential ribs 2 and 3 of the hub, and the outer members having perforated lugs at their outer ends engaging the opposite sides of the ribs of the rim, pivot pins pivotally connecting the inner ends of the inner members of the spokes to the hub, and pivot pins pivotally connecting the outer ends of the spokes to the rim.

In testimony whereof I affix my signature, in the presence of two witnesses.

JEFFERSON D. SHORT.

Witnesses:
HELEN C. RODGERS,
G. Y. THORPE.